(12) United States Patent
Takahashi et al.

(10) Patent No.: US 8,042,489 B2
(45) Date of Patent: Oct. 25, 2011

(54) ANIMAL WASTE COLLECTION SHEET

(75) Inventors: Masayuki Takahashi, Tokyo (JP);
Takeshi Ikegami, Tokyo (JP)

(73) Assignee: Uni-Charm Corporation, Ehime (JP)

( * ) Notice: Subject to any disclaimer, the term of this patent is extended or adjusted under 35 U.S.C. 154(b) by 70 days.

(21) Appl. No.: 12/145,653

(22) Filed: Jun. 25, 2008

(65) Prior Publication Data

US 2009/0000561 A1   Jan. 1, 2009

(30) Foreign Application Priority Data

Jun. 29, 2007   (JP) .................................. 2007-173555

(51) Int. Cl.
*A01K 23/00* (2006.01)
*A01K 29/00* (2006.01)

(52) U.S. Cl. ........................................ 119/171; 119/169

(58) Field of Classification Search ................... 119/161, 119/169, 170; *A01K 23/00, 29/00*
See application file for complete search history.

(56) References Cited

U.S. PATENT DOCUMENTS

| | | | |
|---|---|---|---|
| 3,626,899 A * | 12/1971 | Spellman | 119/169 |
| 5,178,426 A * | 1/1993 | David et al. | 294/1.3 |
| 5,630,376 A * | 5/1997 | Ochi et al. | 119/169 |
| 5,715,772 A * | 2/1998 | Kamrath et al. | 119/169 |
| 5,797,347 A * | 8/1998 | Ochi | 119/169 |
| 6,244,216 B1 * | 6/2001 | Ochi | 119/171 |
| 6,274,218 B1 * | 8/2001 | Shimizu | 428/137 |
| 6,460,484 B2 * | 10/2002 | Ikegami et al. | 119/169 |
| 7,249,570 B1 * | 7/2007 | Roberson | 119/169 |
| 7,594,754 B2 * | 9/2009 | Costello | 383/4 |
| 2003/0143376 A1 | 7/2003 | Toyoshima et al. | |
| 2005/0109284 A1 * | 5/2005 | Helfman | 119/161 |
| 2005/0166855 A1 * | 8/2005 | Kaneko et al. | 119/169 |
| 2005/0166856 A1 * | 8/2005 | Kaneko et al. | 119/169 |
| 2006/0200104 A1 * | 9/2006 | Kaneko et al. | 604/358 |
| 2006/0260556 A1 * | 11/2006 | Renforth | 119/169 |
| 2007/0000446 A1 * | 1/2007 | Dunn et al. | 119/161 |
| 2008/0271679 A1 * | 11/2008 | Kaneko et al. | 119/169 |
| 2009/0044756 A1 * | 2/2009 | Otsuji et al. | 119/169 |

FOREIGN PATENT DOCUMENTS

| | | |
|---|---|---|
| JP | 09-234220 | 9/1997 |
| JP | 3056800 | 3/1999 |
| JP | 11-276519 A1 | 10/1999 |
| JP | 2001-218535 | 8/2001 |
| JP | 2001309730 | 11/2001 |
| JP | 2003250836 | 9/2003 |
| JP | 2005198597 | 7/2005 |
| JP | 2005198598 | 7/2005 |
| JP | 2006-000102 | 1/2006 |
| JP | 2006-181294 | 7/2006 |
| JP | 2006238745 | 9/2006 |

* cited by examiner

*Primary Examiner* — Son T Nguyen
*Assistant Examiner* — Shadi Baniani
(74) *Attorney, Agent, or Firm* — Brinks Hofer Gilson & Lione

(57) ABSTRACT

The present invention provides an animal waste collection sheet effectively inhibiting the leakage of urine, the unclean appearance and the damp or chill surface without increasing the thickness and weight of the top sheet unnecessarily, thus improving the handling property thereof. For example, the animal waste collection sheet is planar and is consisted of a top sheet which is liquid permeable, a back sheet which is liquid impermeable and an absorbent sheet disposed between the top sheet and the back sheet. The top sheet is consisted of a non-woven fabric with convex and concave portions on the surface thereof. The top sheet is preferably a non-woven fabric alternately having a plurality of groove portions and a plurality of convex portions formed in a fixed direction.

4 Claims, 3 Drawing Sheets

ANIMAL WASTE COLLECTION SHEET

This application is based on and claims the benefit of priority from Japanese Patent Application No. 2007-173555, filed on 29 Jun. 2007, the content of which is incorporated herein by reference.

BACKGROUND OF THE INVENTION

1. Field of the Invention

The present invention relates to an animal waste collection sheet for disposing the discharged matter of pets and the like.

2. Background Art

Conventionally, a so-called pet sheet using an absorbent sheet has been known as a pet litter for indoor-kept animals such as dogs and cats, to facilitate the disposal of discharged matter such as urine. For example, Japanese Unexamined Patent Application No. 2001-309730 (hereinafter referred to as "Patent Document 1") and Registered Utility Model No. 3056800 (hereinafter referred to as "Patent Document 2") disclose planar pet sheets including a top sheet which is liquid permeable, a back sheet which is liquid impermeable and an absorbent sheet disposed between the top sheet and the back sheet.

In general, a top sheet constituting a pet sheet such as the abovementioned Patent Documents 1 and 2 includes a conventionally known point bond non-woven fabric, a perforated film and the like. However, pet sheets using these conventional top sheets have following problems:

leakage of the discharged matter from edge portions of pet sheet, due to running of the liquid on the top sheet and lack of liquid holding capacity;

a highly visible urine trace due to a low masking property, leading to an unclean appearance after a repeated use; and a damp or chill surface due to absorbed urine, which discourages pets against using the pet sheet repeatedly.

To address the abovementioned problems, the thickness or the weight of a non-woven fabric constituting the top sheet may be simply increased for an increased masking property and a lowered thermal conductivity. However, a top sheet with increased thickness or weight retains urine and does not allow the urine to be completely absorbed by an absorbent body, and is unfavorable in view of appearance and hygiene. Especially, since pet sheet is a product generally used indoors such as living rooms, solution for the abovementioned problems is extremely important for the target animals and the users. However, function of the conventional pet sheets is insufficient and unsatisfying.

SUMMARY OF THE INVENTION

To solve the abovementioned problems, the present inventors have found that the leakage, the unclean appearance, and the damp or chill surface of the pet sheet can efficiently be avoided by employing a predetermined non-woven fabric with concave and convex portions on the surface thereof, thus leading to the completion of the present invention. More specifically, the invention provides the following.

In a first aspect of the present invention, an animal waste collection sheet is provided, including: a top sheet which is at least partially liquid permeable; a back sheet which is liquid impermeable; and an absorbent sheet disposed between the top sheet and the back sheet, in which the top sheet is composed of a non-woven fabric alternately having a plurality of groove portions and a plurality of convex portions formed in a fixed direction, a side edge region of each of the plurality of convex portions of the top sheet has a fiber orientation parallel to the fixed direction, and a fiber density of the side edge region is higher than an average fiber density of the convex portions.

In a second aspect of the present invention, the animal waste collection sheet of the first aspect is provided, in which a plurality of openings is provided at predetermined intervals on each of the plurality of groove portions of the top sheet.

In a third aspect of the present invention, an animal waste collection sheet is provided, including: a top sheet which is at least partially liquid permeable, a back sheet which is liquid impermeable, and an absorbent sheet disposed between the top sheet and the back sheet, the top sheet is composed of a non-woven fabric having concave portions and convex portions of lattice pattern or of dot pattern, and a fiber density of a side edge region of convex portions of the top sheet is higher than an average fiber density of the convex portions.

The top sheet constituting the conventional animal waste collection sheet (hereinafter also referred to as "sheet") may allow urine to run on a surface layer when urine is discharged thereon, and further allow to reach the edge thereof and to run over the sheet. The animal waste collection sheet of the present invention allows to temporarily retain the discharged matter such as urine by concave and convex portions of lattice pattern or dot pattern provided on the top sheet. The liquid can be held physically for a predetermined amount of time and inhibited from running on the surface layer to the edge of the sheet.

In addition, bulkiness due to the concave and convex portions increases the entire stiffness of the sheet. This can avoid the rewetting (backset of liquid) when the animal steps on the sheet.

Furthermore, light transmission thereof is lowered by the bulkiness due to the concave and convex portions. This can mask the urine trace and improve the appearance of the absorbent sheet, thus the same sheet can be used for increased number of times.

The bulkiness due to the concave and convex portions also lowers the thermal conductivity thereof. The damp or chill of the top sheet after a certain amount of time following urination by an animal such as dog and cat can thus be reduced. When a sheet is used for a plurality of times of urination, animals are likely to avoid urinating in the vicinity of the point of previous urination, judging by color, odor, and temperature. Reduced damp or chill of the surface thereof makes the point of previous urination harder to be sniffed out by animals, thus encouraging the animal to urinate in the vicinity of the point of previous urination. This can prevent the urine from running over the sheet and can encourage the animal to evacuate on the same sheet repeatedly.

It should be noted that the concave and convex portions in the present invention are not particularly limited and may be any high-bulk concave and convex shape, and forming method thereof can be selected appropriately and not particularly limited. Example of the concave and convex shape includes lattice pattern and dot pattern. The concave and convex portions include flat surface with substantially only depressed (concave) portions or substantially only projecting (convex) portions formed thereon.

In the present invention, the groove portion is the abovementioned concave portion which retains the discharged matter such as urine. The urine retained in the central region of the convex portion having a lower fiber density than that of the edge region is promptly transferred to the edge region having a higher density by capillarity effect, and then further transferred to the absorbent sheet having a further higher density by capillarity effect. This allows a faster absorption and an improved drainage of the liquid on the top sheet, which keeps the surface dry and comfortable.

Additionally, according to the second aspect, since the plurality of openings can retain and transfer urine to the absorbent sheet, the urine is absorbed even faster.

In a fourth aspect of the present invention, the animal waste collection sheet of any one of the first to third aspects is provided, in which the top sheet is disposed at least in a marginal portion of the animal waste collection sheet.

The concave and convex portions of the present invention may be provided either on the whole area of the top sheet, or only on an area in which an absorbent sheet is disposed. However, according to the abovementioned configuration, by providing the concave and convex portions also in the marginal portion of the sheet in which the absorbent sheet is not disposed, leakage from the edge portion can effectively be avoided by the bulkiness and the liquid retention capacity of the concave and convex portions.

In a fifth aspect of the present invention, the animal waste collection sheet of any one of the first to the fourth aspects is provided, in which a planar dimension of the top sheet is no less than 600 cm$^2$; and a bending moment of the top sheet in the fixed direction at a curvature of 0.5 cm$^{-1}$ is no less than $1 \times 10^{-2}$ N·m/m.

In this configuration, the bulkiness of the concave and convex portions improves a bending moment and stiffness despite of a large area. This inhibits the deflection and greatly improves a handling property of the sheet. Specifically, since the bending moment in a fixed direction is high and the bending moment in an orthogonal direction which is orthogonal to the fixed direction is low, the sheet becomes flexible. The bending moment is preferably no less than $1 \times 10^{-2}$ N·m/m, nor greater than $20 \times 10^{-2}$ N·m/m. The bending moment higher than $20 \times 10^{-2}$ N·m/m makes the sheet hard to fold for packaging and lowers the handling property thereof. The bending moment will be described in detail in embodiments.

The present invention can effectively inhibit the leakage of urine, the unclean appearance and the damp or chill surface without increasing the thickness and weight of the top sheet unnecessarily, thus improving the handling property thereof.

DETAILED DESCRIPTION OF THE INVENTION

Figure 1:
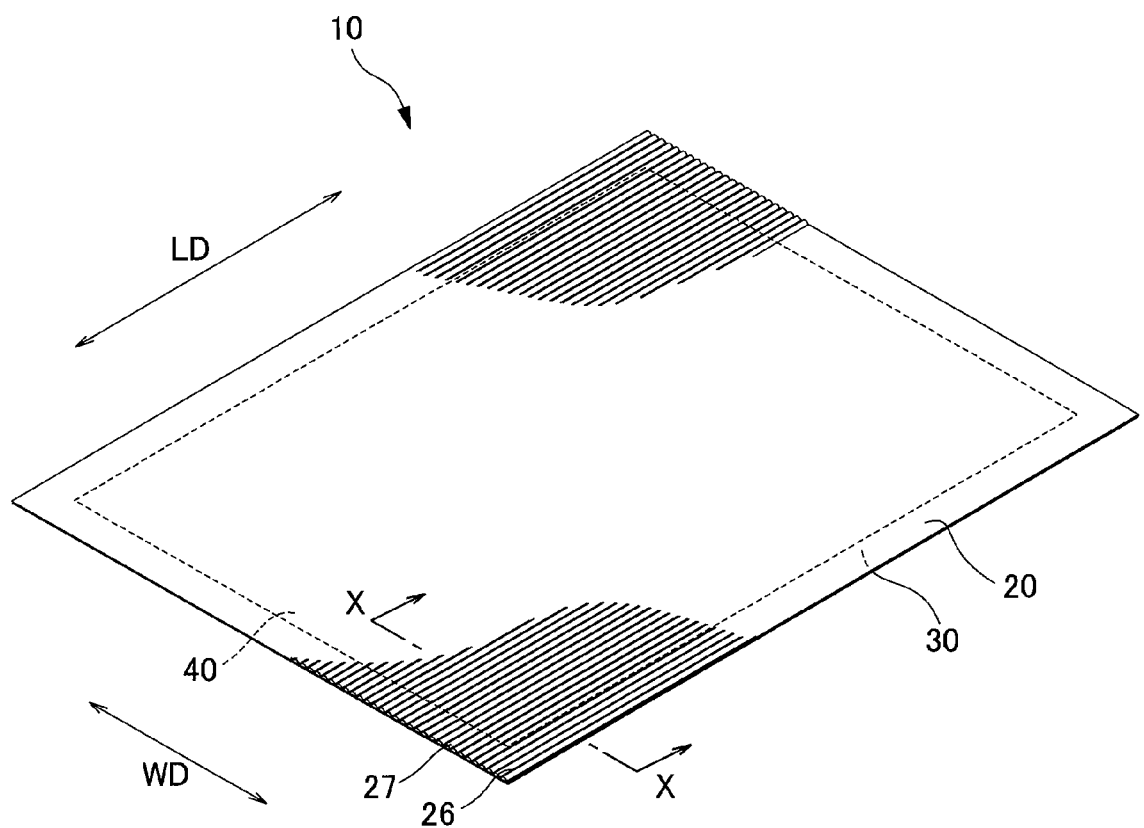
FIG. 1 is a perspective view of an animal waste collection sheet according to the first embodiment of the present invention.

An example of the animal waste collection sheet according to the present invention will be described hereinafter, with reference to drawings.
Overall Configuration As shown in FIG. 1, the animal waste collection sheet 10 according to the present invention is entirely formed in a planar form. The animal waste collection sheet 10 includes: a top sheet portion 20 (also referred to as a top sheet 20) which is at least partially liquid permeable; a back sheet portion 30 (also referred to as a back sheet 30) which is a leakage-proof layer; and an absorbent sheet 40 which absorbs and retains liquid such as discharged matter, disposed between the top sheet portion 20 and the back sheet portion 30. The top sheet portion 20, the back sheet portion 30 and the absorbent sheet 40 are joined with a hot melt adhesive. In the peripheral border of the animal waste collection sheet 10, the top sheet portion 20 and the back sheet portion 30 are joined with a hot melt adhesive.

Size of the animal waste collection sheet 10 is not particularly limited and can be selected appropriately in accordance with the target animal and the size of cage in which the sheet 10 is used; however, the length in a longitudinal direction (LD) is preferably in the range of 30 to 120 cm, and the length in the width direction (WD) is preferably in the range of 20 to 100 cm. A planar dimension thereof is preferably no less than 600 cm$^2$, nor greater than 12000 cm$^2$.

The top sheet 20 is a liquid permeable sheet disposed so as to cover the absorbent sheet 40, which transfers liquid such as discharged matter to the absorbent sheet 40. The top sheet 20 is a non-woven fabric having over the entire surface thereof a plurality of groove portions 26 and a plurality of convex portions 27 formed alternately in a longitudinal direction LD. The top sheet 20 will later be described in detail.

The back sheet portion 30 constitutes a leakage-proof layer of the animal waste collection sheet 10. The back sheet portion 30 is composed of the back sheet 30 which is liquid impermeable and a slip resistance portion (not shown) for fixing the animal waste collection sheet 10. The back sheet 30 can be any sheet substantially liquid impermeable, composed of conventionally known film materials such as polyethylene, polypropylene, polyester and the like.

Figure 2:
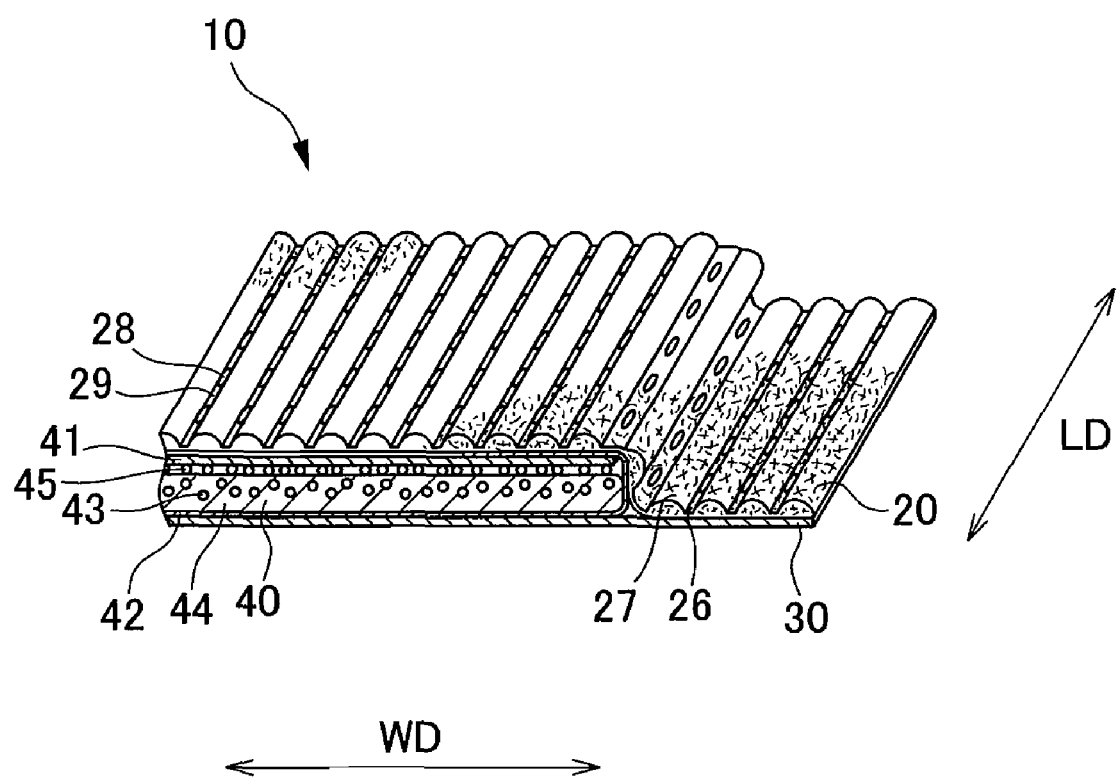
FIG. 2 is a partially enlarged view of a view along an arrow X-X of FIG. 1.

The absorbent sheet 40 is disposed in a substantially central region of the animal waste collection sheet 10 and absorb and retain liquid such as discharged matter discharged from animal's body. The absorbent sheet 40 is not particularly limited and can be any conventionally known absorbent sheet. The absorbent sheet 40 of the present embodiment is composed of, as shown in FIG. 2: a colored (e.g. blue) tissue 41 disposed on the top sheet 20-side; a lower layer tissue 42 with both ends in the width direction WD are turned up on the colored tissue 41, which is disposed on the back sheet 30-side; and a pulverized pulp layer 44 with a first high water-absorption resin 43 is uniformly blended therein, which is disposed between the colored tissue 41 and the lower layer tissue 42.

It should be noted that, in the present embodiment, material, shape, size and the like of each of the constituent members of the animal waste collection sheet 10 are not particularly limited; any conventionally known member can be appropriately used.
Top Sheet The top sheet 20 can be a non-woven fabric with a plurality of groove portions 26 formed at substantially equal intervals, a plurality of convex portions 27 formed therebetween, and a plurality of openings 28 formed at predetermined intervals by a joining portion 29 in each of the groove portions 26.

Figure 3:
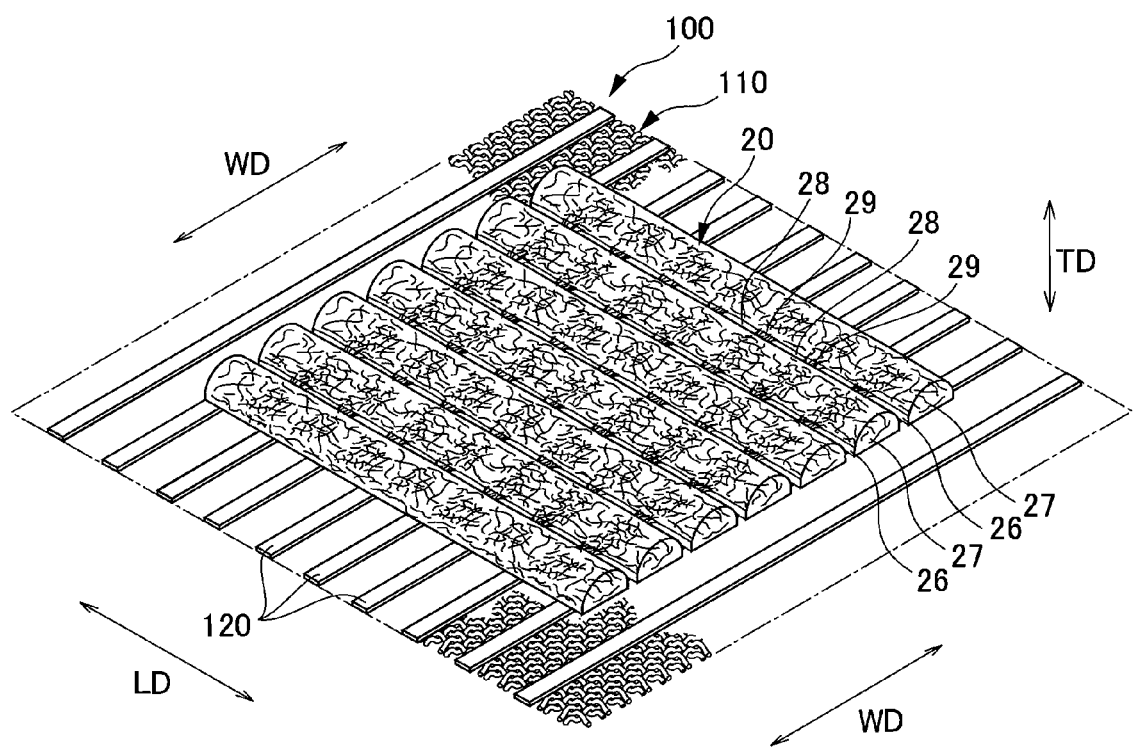
FIG. 3 is a diagram illustrating a manufacturing method of a top sheet used in the present invention.

Such non-woven fabric with a plurality of groove portions 26, a plurality of convex portions 27 and a plurality of openings 28 in each of the groove portions 26 can be formed, for example, using a supporting member 100, as shown in FIG. 3. The supporting member 100 is composed of: a net-shaped first supporting member 110; and plate-like second supporting members 120 disposed regularly at predetermined intervals in a direction orthogonal to the groove portions 26.

The groove portions 26 and the convex portions 27 are formed by: supporting a fiber web, which is a fiber aggregate, by the supporting member 100, which is air-permeable, from the lower surface thereof; and gas (e.g. air flow) is blown from the upper surface thereof against the positions of the plurality of groove portions 26 to push fibers away constituting the fiber web. At the same time, the joining portions 29 and the openings 28 are alternately formed by the second supporting members 120. The fiber aggregate is sheet-shaped and has a degree of freedom allowing the fiber thereof to move thereinside. The fiber orientation, the fiber density or the weight of the fiber can be arbitrary adjusted in accordance with several conditions, such as amount, tension and the like of blown fluid (for example hot air) composed mainly of gas. By the presence of the groove portions 26 on the top sheet 20 and of the openings on the groove portions, the abovementioned animal waste collection sheet, which has a superior liquid permeability, can be obtained.

The supporting member 100 of the present invention can be consisted solely of the first supporting member 110. In this case, only the joining portions 29 are provided, and not the openings 28, on the groove portions 26 of the top sheet 20.

As a result of blowing air flow to arrange and rearrange the fibers, each of the convex portions 27 has side edge regions and a central regions therebetween, with a thickness higher than that of the side edge regions. The side edge regions have a substantially uniform fiber density in a thickness direction TD of the non-woven fabric, which is higher than an average fiber density of the entire convex portion 27 (side edge regions and a central region). The central region has a substantially uniform fiber density in a thickness direction TD of the non-woven fabric, which is lower than an average fiber density of the entire convex portion 27 (side edge regions and a central region).

Example of the fiber density at the bottom of the groove portions 26 includes, specifically: no greater than 0.18 g/cm$^3$; preferably in the range of 0.002 to 0.18 g/cm$^3$; more preferably in the range of 0.005 to 0.05 g/cm$^3$. If the fiber density of the bottom portion of the groove portions 26 is less than 0.002 g/cm$^3$, the top sheet 20 used in an animal waste collection sheet, for example, may easily be damaged. If the fiber density at the bottom portion of the groove portions 26 is greater than 0.18 g/cm$^3$, it is difficult for the liquid to travel downward and will be retained at the groove portions 26, giving a user (such as a pet animal and a pet owner) a moist sensation.

Fiber density at the central region of the convex portions 27 is in the range of 0 to 0.20 g/cm$^3$; preferably in the range of 0.005 to 0.20 g/cm$^3$; more preferably in the range of 0.007 to 0.07 g/cm$^3$, for example. If the fiber density of the central region is less than 0.005 g/cm$^3$, not only is it easier for the central region to be crushed by the weight of the liquid contained in the central regions or by external pressure, but it also becomes easier for the liquid once absorbed in the absorbent article to reverse back, under the applied pressure. If the fiber density at the central region is greater than 0.20 g/cm$^3$, it is difficult for the liquid contained at the central region to travel downward and will be retained in the groove portion, giving a user (such as a pet animal and a pet owner) a moist sensation.

Fiber density at the side edge region of the convex portions 27 is in the range of 0 to 0.40 g/cm$^3$; preferably in the range of 0.007 to 0.25 g/cm$^3$; more preferably in the range of 0.01 to 0.20 g/cm$^3$, for example. If the fiber density at the side edge region is less than 0.007 g/cm$^3$, there may be cases in which the side edge region will become stretched by line tension. If the fiber density at the side edge regions is greater than 0.40 g/cm$^3$, it is difficult for the liquid contained at the side edge regions to travel downward. Thus, the liquid will be retained at the side edge regions, giving a user (such as a pet animal and a pet owner) a moist sensation.

According to the abovementioned configuration, fiber constituting the side edge regions of the convex portions 27 is rearranged to the orientation in the longitudinal direction LD and the density thereof is high. Thus, the bulkiness of the side edge regions and the convex portions 27 makes the bending stiffness in the longitudinal direction LD high. This allows the central region to be supported by the high-stiffness side edge regions positioned on the both sides thereof, in cases in which the external pressure is applied to the convex portions 27. This makes the plurality of convex portions 27 resistant to crushing due to the external pressure. Consequently, the side edge regions make the bending stiffness in the longitudinal direction LD high. In addition to the increased bending stiffness due to the bulkiness of the convex portions, the increased resilience to the original shape after bending is obtained due to the bulk resilience of the convex portions.

On the other hand, as a result of blowing air flow to arrange and rearrange the fibers, the groove portions 26 have a weight lighter than that of the convex portions 27. Therefore, the top sheet can easily bend at the groove portion 26 in the width direction.

A fiber web formed by a carding method using relatively long fibers is suitable for arranging and rearranging the fibers by blowing air flow. In order that after groove portions (concave and convex portions) are formed by a plurality of air flows, the fibers are made into a non-woven fabric with its shape retained, it is preferable to employ a through-air method where thermoplastic fibers are subjected to hot melting by oven processing (heat treatment). Fibers suitable for this manufacturing method are preferably those having the core-in-sheath structure or side-by-side structure in order to heat-seal intersecting points of the fibers or are more preferably those having the core-in-sheath structure in which sheaths can be infallibly heat-sealed. Specifically, the sheath-core type compound fiber consisting of polyethylene terephthalate and polyethylene, or the sheath-core type compound fiber consisting of polypropylene and polyethylene is preferably used. These fibers may be used alone or in combination. The length of fibers is preferably in the range of 20 to 100 mm, and more preferably in the range of 35 to 65 mm.

Thickness of the top sheet 20 is preferably greater than 0.6 mm, more preferably in the range of 0.6 to 3.5 mm, particularly preferably in the range of 0.7 to 3.0 mm, and most preferably in the range of 1.0 to 2.5 mm. If the thickness is less than 0.6 mm, the entire sheet becomes easy to bend, and the liquid holding capacity of the sheet and the liquid retentive capacity of the abovementioned concave and convex portions become insufficient. Thickness greater than 3.5 mm is not preferred because transfer of liquid to the absorbent sheet 40 may be inhibited and the target animals may not recognize the sheet as litter.

Example of an average weight of the top sheet 20 includes, for example, 10 to 200 g/m$^2$, preferably 20 to 100 g/m$^2$. When the average weight is less than 10 g/m$^2$, the top sheet 20 may easily be broken during use. Additionally, if the average weight is greater than 200 g/m$^2$, downward transfer of liquid may be inhibited.

An average weight of the bottom of the groove portions 26 is in the range of 3 to 150 g/m$^2$ and preferably in the range of 5 to 80 g/m$^2$, for example. The average weight of the convex portions 27 is adjusted so as to be higher than that of the groove portions 26; an average weight of the central region of the convex portions 27 is, for example, in the range of 15 to 250 g/m$^2$ and more preferably in the range of 20 to 120 g/m$^2$. The average weight of the side edge regions is, for example, in the range of 20 to 280 g/m$^2$; preferably in the range of 25 to 150 g/m$^2$.

In the abovementioned embodiment, the top sheet 20 used in the animal waste collection sheet 10 has: the groove portions 26 allowing the liquid to permeate; and the convex portions 27 having a porous structure and thus is difficult to retain the liquid. The fiber density and the weight of the bottom portion of the groove portions 26 are lower than that of the other areas, thus being suitable for allowing the liquid to permeate. It is particularly the case with the openings 28. As the fibers on the bottom of the groove portions 26 are oriented in the width direction WD, it is possible to prevent wide spreading of the liquid excessively flown in the longitudinal direction LD of the groove portions 26. The fibers are oriented in the width direction WD of the groove portions 26, so regardless of the fact that the weight is lower than that of other areas, the strength of the non-woven fabric 110 in the width direction WD is increased. The weight of the convex portions 27 is adjusted to be greater than that of the other areas, and because this increases the number of fibers, the number of fusion points also increases and the porous structure is maintained.

EXAMPLES

The present invention is described hereinafter in further detail with reference to examples.

Manufacturing Example

Example 1

A through-air non-woven fabric of a weight of 35 g/m$^2$ and a thickness of 1.96 mm for the top sheet 20 is manufactured using a hydrophilic core-in-sheath compound fiber consisting of polyethylene terephthalate and polyethylene (fiber diameter 3.3 dtex, fiber length 50 mm) in a method shown in FIG. 3, with: a plurality of groove portions 26 formed on one side thereof at equal intervals; a plurality of convex portions 27 formed therebetween; and a plurality of openings 28 formed in each of the groove portions 26.

Example 1 is obtained by manufacturing an animal waste collection sheet 10 of 450 mm in LD and 345 mm in WD (absorbent sheet 410 mm in LD and 300 mm in WD), shown in the abovementioned FIGS. 1 and 2, bonding the sheets to each other by hot melt adhesion, using the following constitutive materials in addition:

a colored tissue 41 of 15 g/m$^2$ in weight;
a lower layer tissue 42 (uncolored) of 14 g/m$^2$ in weight;
a first high-water absorption resin 43, uniformly blended into a pulverized pulp layer at a ratio of 33 g/m$^2$ with vortex for 5 seconds;
a pulverized pulp layer 44 of an average fiber length approximately of 2.2 mm and of 60 g/m$^2$ in weight, obtained by pulverizing NBKP (bleached softwood kraft pulp) sheet;
a second high-water absorption resin 45, with vortex for 35 seconds and a spray volume of 33 g/m$^2$; and
a back sheet 30, an air-impermeable polyethylene film of 18.5 g/m$^2$ in weight.

Manufacturing Example

Example 2, Comparative Examples 1 to 8

Example 2 and Comparative examples 1 to 8 are obtained by changing the configuration of the top sheet of Example 1 as shown in Table 1. Weight and thickness of the non-woven fabric of Example 2 are different from that of Example 1. Non-woven fabrics of Comparative examples 1 to 4 are two-layered; a hydrophilic core-in-sheath compound fiber consisting of polyethylene terephthalate and polyethylene of 2.2 dtex and fiber length of 50 mm in a lower layer; and a hydrophilic core-in-sheath compound fiber consisting of polyethylene terephthalate and polyethylene of 4.4 dtex and fiber length of 50 mm in an upper layer.

It should be noted that, in Tables, TA refers to a through-air non-woven fabric; PB refers to a point bond non-woven fabric; SB refers to a spun bond non-woven fabric; and SMS refers to a spun bond/melt blown/spun bond non-woven fabric. Thickness of top sheets is obtained by layering 10 sheets, measuring using UF-60A (manufactured by DAIEI KAGAKU SEIKI MFG. CO., LTD.) with a load of 3 g and obtaining a value for one sheet.

Testing Example 1

Regarding the Examples and Comparative examples, amount of absorbed normal saline solution is shown in Table 1 and result of leakage evaluation of normal saline solution is shown in Table 2.

Amount of liquid absorbed by a top sheet is measured by the following procedure:

1. Measuring the weight of a sample in size of 10 cm×10 cm;
2. Impregnating the sample in a 0.9% normal saline solution for 10 minutes;
3. After impregnating, taking the sample out of the normal saline solution and hanging for 10 minutes;
4. Calculating the amount of liquid being absorbed by measuring the weight of the sample.

Values of leakage evaluation are obtained by: dripping 40 cc (60 cc) of a 0.9% normal saline solution from a height of 3 cm to positions located 2 cm and 4 cm inside of the end of an absorbent sheet of the sheet, in 8 seconds (12 seconds); and measuring the amount (g) of the normal saline solution running over the sheet and leaked from the product.

TABLE 1

| | Type of Top Sheet | Presence of Concavity and Convexity On Surface | Weight (g/m$^2$) | Thickness (mm) | Amount of Absorbed Liquid (g/m$^2$) |
|---|---|---|---|---|---|
| Example 1 | TA | Yes | 35 | 1.96 | 536 |
| Example 2 | TA | Yes | 35 | 1.52 | 580 |
| Comparative Example 1 | TA | No | 35 | 0.89 | 500 |
| Comparative Example 2 | TA | No | 40 | 1.44 | 230 |
| Comparative Example 3 | TA | No | 25 | 0.87 | 119 |
| Comparative Example 4 | TA | No | 20 | 0.74 | 116 |
| Comparative Example 5 | PB | No | 18 | 0.23 | 58 |
| Comparative Example 6 | SB | No | 20 | 0.28 | 62 |
| Comparative Example 7 | SMS | No | 13 | 0.14 | 55 |
| Comparative Example 8 | Perforated Film | No | 20 | 0.54 | 92 |

TABLE 2

| | 40 cc Dripped | | 60 cc Dripped | |
|---|---|---|---|---|
| | 2 cm Inside | 4 cm Inside | 2 cm Inside | 4 cm Inside |
| Example 1 | 0 | 0 | 0 | 0 |
| Example 2 | 0 | 0 | 0 | 0 |
| Comparative | 0 | 0 | 6 | 0 |

TABLE 2-continued

|  | 40 cc Dripped | | 60 cc Dripped | |
| --- | --- | --- | --- | --- |
|  | 2 cm Inside | 4 cm Inside | 2 cm Inside | 4 cm Inside |
| Example 1 |  |  |  |  |
| Comparative Example 2 | 0 | 0 | 10.1 | 0 |
| Comparative Example 3 | 0 | 0 | 7.4 | 0 |
| Comparative Example 4 | 0 | 0 | 7.8 | 6.5 |
| Comparative Example 5 | 7.2 | 3.5 | — | — |
| Comparative Example 6 | 7.8 | 2.7 | — | — |
| Comparative Example 7 | 9.6 | 1.1 | — | — |
| Comparative Example 8 | 12.6 | 0 | — | — |

As shown in Tables 1 and 2, since the present invention can instantaneously hold the liquid in the concave portion of the convex and concave portions and can absorb the liquid swiftly running out from the absorbent body in the convex and concave portions, leakage of the liquid can be prevented more reliably comparing to the Comparative Examples without the convex and concave portions.

Testing Example 2

Regarding Example 1, Comparative Examples 1, 5, 6, and 7, result of the evaluation regarding unclean appearance and chill (cold sensation) of the surface is shown in Table 3. The light transmittance (%) was measured only on the top sheet, using a turbidimeter NDH-300A (manufactured by Nippon Denshoku Kogyo Co., Ltd.). qmax is a unit for evaluating a cold sensation (heat transfer) perceived when human finger is in contact with an object; a small value thereof means a lower heat transfer and less cold sensation. qmax values in Tables were obtained using Finger-Robot Thermo Labo (manufactured by KATO TECH CO., LTD.). First, qmax value of the non-woven fabric (the top sheet) alone was obtained by placing the non-woven fabric flat on a metal piece of 3.5 kg (SUS304) and measuring with a load of 150 to 200 g. 30 minutes after dripping 40 cc of normal saline solution in 10 seconds, qmax value after absorption of 40 cc was measured with a load of 150 to 200 g, with a dripping point as a center.

Masking property was evaluated by adding 0.45 g of yellow dye (Sunset Yellow FCF) and 0.0075 g of Brilliant Blue FCF to 15 L of normal saline solution, dripping 40 cc thereof in 10 seconds on a sample, and then evaluating by visual observation after 3 minutes according to 5 ranks: 5—Clearly Visible; 4—Visible; 3—Somewhat Visible; 2—Slightly Visible; and 1—Almost Invisible. Likewise, cold sensation was evaluated by adding 0.45 g of yellow dye (Sunset Yellow FCF) and 0.0075 g of Brilliant Blue FCF to 15 L of normal saline solution, dripping 40 cc thereof in 10 seconds on a sample, and then evaluating according to 5 ranks after 30 minutes. The smaller value means less cold sensation, thus being preferable.

TABLE 3

|  | Light Transmission (%) | qmax | qmax After Absorption of 40 cc | Masking Property of Yellow NSS | Cold Sensation After 30 min |
| --- | --- | --- | --- | --- | --- |
| Example 1 | 63.95 | 0.035 | 0.097 | 1 | 1 |
| Comparative Example 1 | 82.67 | 0.133 | 0.182 | 3 | 3 |
| Comparative Example 5 | 89.4 | 0.257 | 0.227 | 5 | 5 |
| Comparative Example 6 | 87.26 | 0.253 | 0.234 | 4 | 5 |
| Comparative Example 8 | 72.63 | 0.075 | 0.137 | 2 | 1 |

As shown in Table 3, the present invention has a superior masking property and allows less heat transfer compared to Comparative Examples, thus being preferable.

Test Example 3

Regarding Example 1, Comparative Examples 1, 5, 6, and 7, result of the evaluation regarding the bending moment (N·m/m) and the resilience after twist and folding is shown in Table 4. It should be noted that the bending moment was evaluated with a top sheet alone. The bending moment at a curvature of $0.5$ cm$^{-1}$ and the curvature which makes the bending moment 0 when being restored to the original shape were evaluated using KES-FB2-AUTO-A (manufactured by KATO TECH CO., LTD.).

The resilience after twist was evaluated by the following procedure:

1. Preparing a pet sheet;
2. Drawing three folding lines on an absorbent body from the lower end of the sheet with a marker pen, at intervals of 5 cm;
3. Folding the sheet on an acrylic plate of thickness of 10 mm, with two cylindrical bars of a diameter of 10 mm on the folding lines at 5 cm and 15 cm facing inside, and with another cylindrical bar of the same diameter on the other side of the folding line of 10 cm facing outside, while tucking the upper portion of the sheet, without folding lines, with another acrylic plate of thickness of 10 mm and a weight of 3.5 kg to hold;
4. Taking out all the cylindrical bars, restoring the lower portion of the sheet, measuring the restored length thereof for 3 times, and obtaining an average value thereof.

The resilience after folding was evaluated by the following procedure:

1. Preparing a pet sheet;
2. Marking a point on each of two sides of the pet sheet, so that an angle and the two sides form an isosceles triangle.
3. Placing a weight of 3.5 kg, of plane area of 10 cm×10 cm on the outside of a folding line portion (a line connecting the two points) while not folding an absorbent body, pinching the angle portion (an apex of the isosceles triangle) and folding back at the folding line;
4. Releasing the angle portion, judging if the sheet unfolds; if it is the case, gradually increasing distance between the apex and the folding line to determine the distance in which the folded portion does not unfold.

TABLE 4

| | MD Bending Moment | MD Curvature 0 | CD Bending Moment | CD Curvature 0 | Resilience After Twist MD (cm) | Resilience After Folding (cm) |
|---|---|---|---|---|---|---|
| Example 1 | 5.46 | 0.066 | 1.47 | 0.139 | 14.8 | 28 |
| Comparative Example 1 | 1.17 | 0.059 | 0.74 | 0.067 | 14.5 | 22 |
| Comparative Example 5 | 0.52 | 0.075 | 0.16 | 0.203 | 8 | 17 |
| Comparative Example 6 | 0.87 | 0.106 | 0.24 | 0.175 | 9 | 17 |
| Comparative Example 7 | 0.35 | 0.054 | 0.28 | 0.095 | 6 | 18 |

As shown in Table 4, the present invention has a higher bending moment and superior handling property due to the bulkiness of the concave and convex portions, compared to Comparative Examples.

What is claimed is:

1. An animal waste collection sheet comprising: a top sheet which is at least partially liquid permeable; a back sheet which is liquid impermeable; and an absorbent sheet disposed between the top sheet and the back sheet, wherein:
   the top sheet consists of a single fiber web layer formed to have alternately a plurality of groove portions and a plurality of convex portions formed in a predetermined direction;
   each convex portion has a convex central region and side edge regions at both sides of the central region and sandwiching the central region, the convex portion being extended along the predetermined direction,
   the side edge region of each of the plurality of convex portions fiber has a orientation parallel to the predetermined direction; and
   a fiber density of the side edge region is higher than a fiber density of the convex portion, and the fiber density of the convex region in the thickness direction of the top sheet is substantially uniform; and a bottom of the groove portions has a fiber density no greater than 0.18 g/cm$^3$;
   the central region of the convex portion has a fiber density in the range of 0.005 to 0.20 g/cm$^3$; and the side edge region of the convex portions has a fiber density in the range of 0.007 to 0.40 g/cm$^3$.

2. The animal waste collection sheet according to claim 1, wherein a plurality of through holes is provided at predetermined intervals on each of the plurality of groove portions of the top sheet.

3. The animal waste collection sheet according to claim 1, wherein the top sheet is extended at least in a marginal portion of the animal waste collection sheet.

4. The animal waste collection sheet according to claim 1, wherein: a planar dimension of the top sheet is no less than 600 cm$^2$; and a bending moment of the top sheet in the fixed direction at a curvature of 0.5 cm$^{-1}$ is no less than $1\times10^{-2}$ N·m/m.

* * * * *